United States Patent
Demmer et al.

(10) Patent No.: US 8,797,529 B2
(45) Date of Patent: *Aug. 5, 2014

(54) SPECTROMETER DESIGN FOR ABERRATION CORRECTION, SIMPLIFIED MANUFACTURE, AND COMPACT FOOTPRINT

(75) Inventors: David R. Demmer, Toronto (CA); Thomas L. Haslett, Toronto (CA); Joseph L. Dallas, Maple Glen, PA (US)

(73) Assignee: Ocean Optics, Inc., Dunedin, FL (US)

( * ) Notice: Subject to any disclaimer, the term of this patent is extended or adjusted under 35 U.S.C. 154(b) by 355 days.

This patent is subject to a terminal disclaimer.

(21) Appl. No.: 13/355,543

(22) Filed: Jan. 22, 2012

(65) Prior Publication Data

US 2012/0188541 A1 Jul. 26, 2012

Related U.S. Application Data

(60) Provisional application No. 61/435,981, filed on Jan. 25, 2011.

(51) Int. Cl.
*G01J 3/28* (2006.01)
*G02B 26/02* (2006.01)
*G01J 3/04* (2006.01)
*G01J 3/02* (2006.01)
*G01J 3/18* (2006.01)

(52) U.S. Cl.
CPC .............. *G01J 3/0256* (2013.01); *G01J 3/04* (2013.01); *G01J 3/0291* (2013.01); *G01J 3/0208* (2013.01); *G01J 3/0229* (2013.01); *G01J 3/18* (2013.01); *G01J 3/0286* (2013.01)
USPC .......................................... 356/328; 359/232

(58) Field of Classification Search
CPC ................................................ G01J 3/02–3/108
USPC .......... 356/300–334; 359/232, 233, 462–464, 359/618, 619, 621, 622
See application file for complete search history.

(56) References Cited

U.S. PATENT DOCUMENTS

| | | | | | |
|---|---|---|---|---|---|
| 2,788,708 | A | * | 4/1957 | Williamson | 359/736 |
| 3,409,374 | A | * | 11/1968 | McPherson | 356/331 |
| 5,767,966 | A | * | 6/1998 | Iwasaki | 356/328 |
| 5,781,290 | A | * | 7/1998 | Bittner et al. | 356/326 |
| 5,969,812 | A | * | 10/1999 | Carver | 356/319 |
| 6,507,398 | B1 | * | 1/2003 | Arai et al. | 356/328 |
| 7,209,230 | B2 | * | 4/2007 | Odhner | 356/328 |
| 7,233,394 | B2 | * | 6/2007 | Odhner | 356/328 |
| 7,345,760 | B2 | * | 3/2008 | Deck | 356/334 |
| 8,345,226 | B2 | * | 1/2013 | Zhang | 356/39 |
| 8,537,343 | B2 | * | 9/2013 | Zhang | 356/39 |
| 2009/0091754 | A1 | * | 4/2009 | Zhang | 356/326 |
| 2009/0103088 | A1 | * | 4/2009 | Delmas et al. | 356/328 |
| 2010/0309454 | A1 | * | 12/2010 | Zhang | 356/39 |
| 2012/0188542 | A1 | * | 7/2012 | Demmer et al. | 356/328 |

* cited by examiner

*Primary Examiner* — Kara E Geisel
*Assistant Examiner* — Violeta A Prieto
(74) *Attorney, Agent, or Firm* — Dennis L. Cook, Esq.

(57) ABSTRACT

A spectrometer design method that corrects aberration by using crossed optical paths and minor alignment, simplifies manufacture by applying the light entrance slit and aperture on opposite sides of a transparent input block, and creates a more compact footprint by placing a 45 degree mirror or right angle prism directly in front of the detector is disclosed.

4 Claims, 4 Drawing Sheets

SPECTROMETER DESIGN FOR ABERRATION CORRECTION, SIMPLIFIED MANUFACTURE, AND COMPACT FOOTPRINT

CROSS-REFERENCE TO RELATED APPLICATION

The present application claims the benefit of previously filed Provisional patent application Ser. No. 61/435,981 filed on Jan. 25, 2011.

FIELD OF THE INVENTION

This invention belongs to the field of design and manufacture of spectrometers. More specifically it is spectrometer design to correct aberration, simplify manufacture, and create a more compact footprint.

BACKGROUND OF THE INVENTION

A spectrometer is a device capable of separating an input light source into its constituent spectral components and separately measuring the intensity of each such component. Spectrometers can be further classified by the nature of their dispersive element, which can be a prism or diffraction grating. In addition, if the entire dispersed spectrum is measured simultaneously by means of a photographic plate or detector array it is described as a spectrograph, and if each spectral component is presented separately to a single detector it is commonly known as a monochromator.

The following disclosure presents a number of unique features which, when incorporated into the design of a grating spectrograph, greatly facilitates performance and ease of manufacture. An appreciation of the advantages these features represent when compared with previous designs can be derived from consideration of the basic Czerny-Turner layout of a grating spectrometer as shown in FIG. 1.

The light which is to be analyzed is presented to the spectrometer through an entrance slit (1). To control the divergence of this source inside the spectrometer and ensure it does not lead to overfilling of the entrance minor, M1 (3), an aperture (2) is used after the slit to limit the acceptance cone to only light that will strike the input mirror (3). The aperture (2) size is usually expressed as an f-number by comparing the size of the beam at M1 (3) to the focal length of M1 (3).

Mirrors are used as focusing elements in order to avoid the problem of chromatic aberration, which is present to some extent in any system employing lenses.

Because lenses cannot be employed M1 (3) is a curved mirror. In order that the light reflected from it be directed towards the diffraction grating (5), M1 (3) is necessarily used as an off-axis collimating element. This introduces a variety of aberrations into the collimated beam due to astigmatism and coma. The result is that the nominally collimated beam actually contains a distribution of angles.

The diffraction angle from the grating (5) depends non-linearly on the angle of incidence, so the angular distribution present in the incident beam is broadened in the diffracted beam. Furthermore, since the diffraction angle is also a function of wavelength, the output distributions differ for the various wavelength components of the beam.

M2 (4) is also used as an off-axis element, and therefore contributes its own aberrations into the image formed at the detector (6). M2 (4) must be larger than M1 (3) in order to avoid vignetting the dispersed light diffracted from the grating (5). Since different portions of M2 (4) are used by different wavelength components, the aberration contributions are different as well.

Finally, note that for any given layout of the mirrors (3 & 4) and grating (5) only a single spectral component will encounter the center of each of these elements. Due to diffraction, other spectral components will diverge from the path of the center component to a greater or lesser extent depending on their wavelength and angle of incidence at the grating (5). If their divergence is too large they will miss either the second mirror (4) or the sensitive area of the detector (6). Thus, any given configuration will have a wavelength range, characterized by a center wavelength and a minimum and maximum wavelength.

These issues are all well-known, and are traditionally addressed by designing the optical system to minimize both the fold angles and thus, necessarily, the input aperture. By holding both parameters to the smallest possible values the aberrations are minimized.

BRIEF SUMMARY OF THE INVENTION

This invention is a method for improving image quality in a spectrometer and is a spectrometer design to correct aberration, simplify manufacture, and create a more compact footprint.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENT

Despite the issues being well known, and the small-angle compensation approach commonly taken, every conventional spectrometer still suffers from the problem that the image of the slit (1) at the detector (6) plane suffers some degree of aberration, which limits the spectral resolution that can be achieved. One effect of these aberrations is to produce a curved image of the entrance slit (1) as is well known to those skilled in the art.

There are a number of prior art methods employed to reduce the impact of this effect. One is to use a device to limit the height of the image that is recorded. This has the disadvantage that efficiency is reduced by blocking portions of the light from reaching the detector (6). Another is to use an entrance slit (1) that is curved in such a way that the spectrometer aberrations produce a straight image. A variation on the latter, which is applicable to monochromators, is to use a curved exit slit (not shown). Both of these methods constitute a significant added expense in the fabrication of the slit assemblies.

Figure 2:
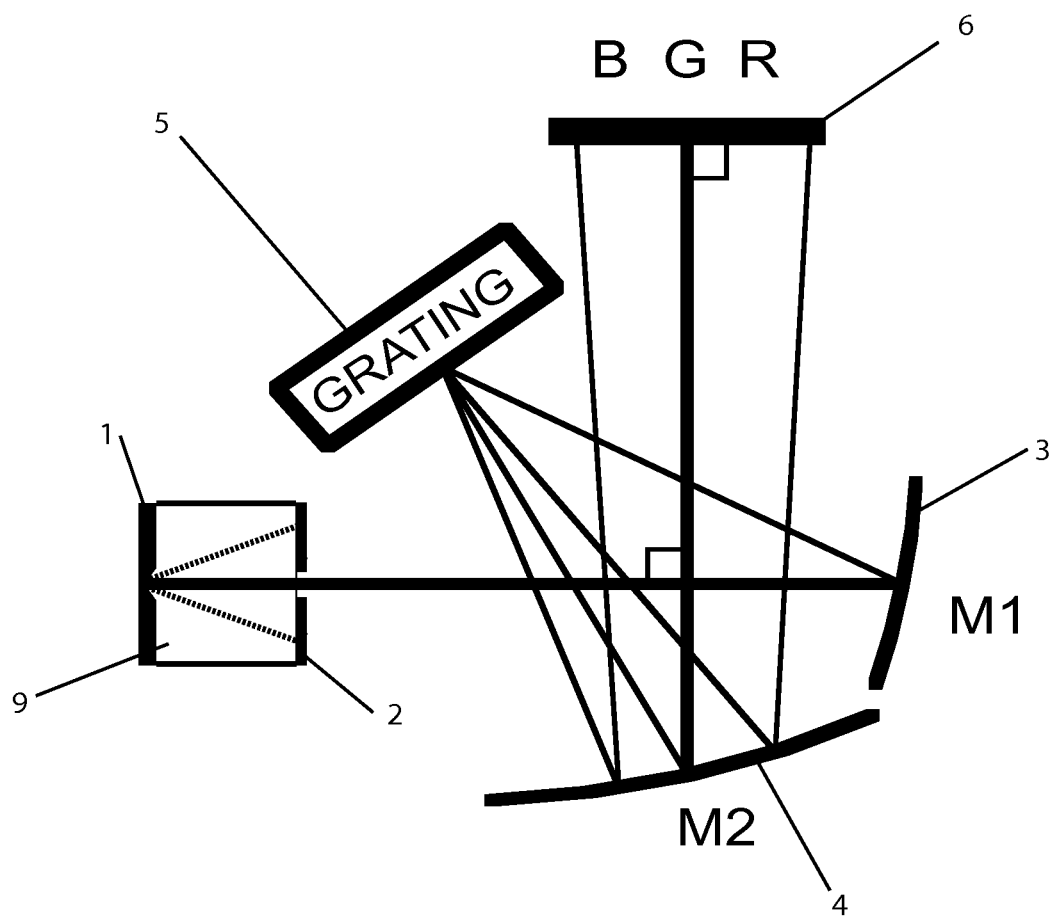
FIG. 2 shows a layout of a preferred embodiment of the invention.

However the most common method is to simply minimize the fold angles, but this necessarily increases the overall device size for a given grating size. One way to mitigate this problem is to use a so-called crossed Czerny-Turner design of this disclosure, the preferred embodiment of which is illustrated in FIG. 2. Comparing these two variations of the Czerny-Turner design, note that the fold induced by M2 (4) in the crossed configuration is in the opposite direction to that induced by M1 (3). This has the effect of reversing some of the aberrations induced by the fold at M1 (3) rather than reinforcing them as is the case with the un-crossed version.

Therefore, by careful choice of the minor focal lengths and fold angles a configuration can be achieved where the aberrations introduced by the first mirror (3) are compensated by the aberrations introduced by the second minor (4).

The choice of parameters can be described by reference to FIG. 3. The fold angles and mirror (3 & 4) focal lengths must be controlled to maintain a plane of symmetry running through the center of the grating (5) and the crossing point, XP, of the ray defining the center of the wavelength range. Specifically, this means the angles K1 and K2 must be held equal for the wavelength of the spectral component that forms the center of the wavelength range:

$$K1=K2=K$$

Furthermore, the symmetry requirement constrains the mirror (3 & 4) fold angles to be equal so that FA1=FA2=FA and $$2FA+2K=90°$$

Figure 3:
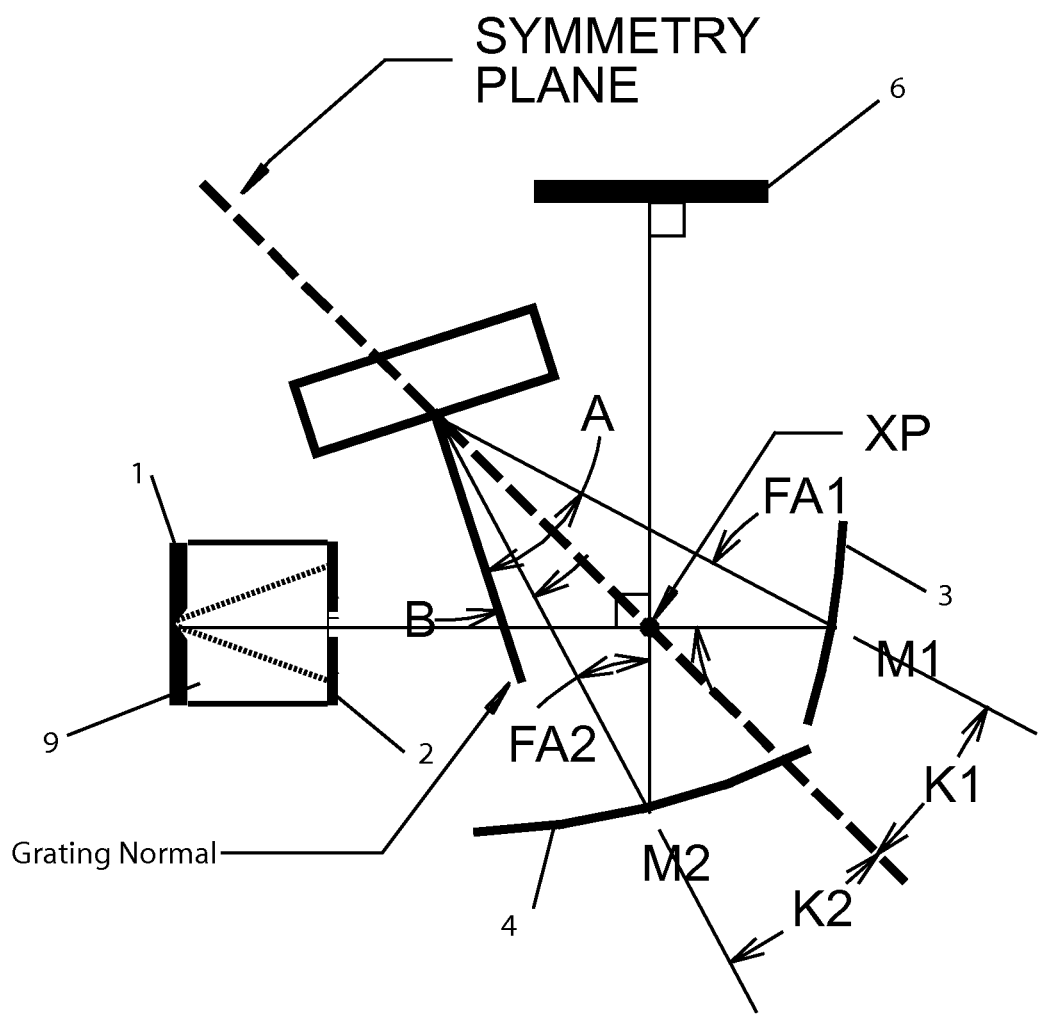
FIG. 3 shows a layout of a preferred embodiment of the invention.

The wavelength of this center component is determined by the angle of incidence of the ray incident at the grating (5), A, and the angle of diffraction from the grating (5), B, through the relation:

$$Gm\lambda_c = \sin A + \sin B$$

where $\lambda_c$ is the wavelength of the center component, G is the groove density of the grating (5) (lines per mm), and A and B are defined in FIG. 3.
The output beam is folded down through the plane of the figure using a right angle prism (9).

Together, these relations define a geometry which will fully compensate the curvature of the slit (1) image for a chosen wavelength, $\lambda_C$, determined by the choice of a single parameter, the angle of incidence, A. For this geometry the images of the spectrally dispersed components will lie on a line perpendicular to the path of the center wavelength after reflection from M2 (4).

Figure 1:
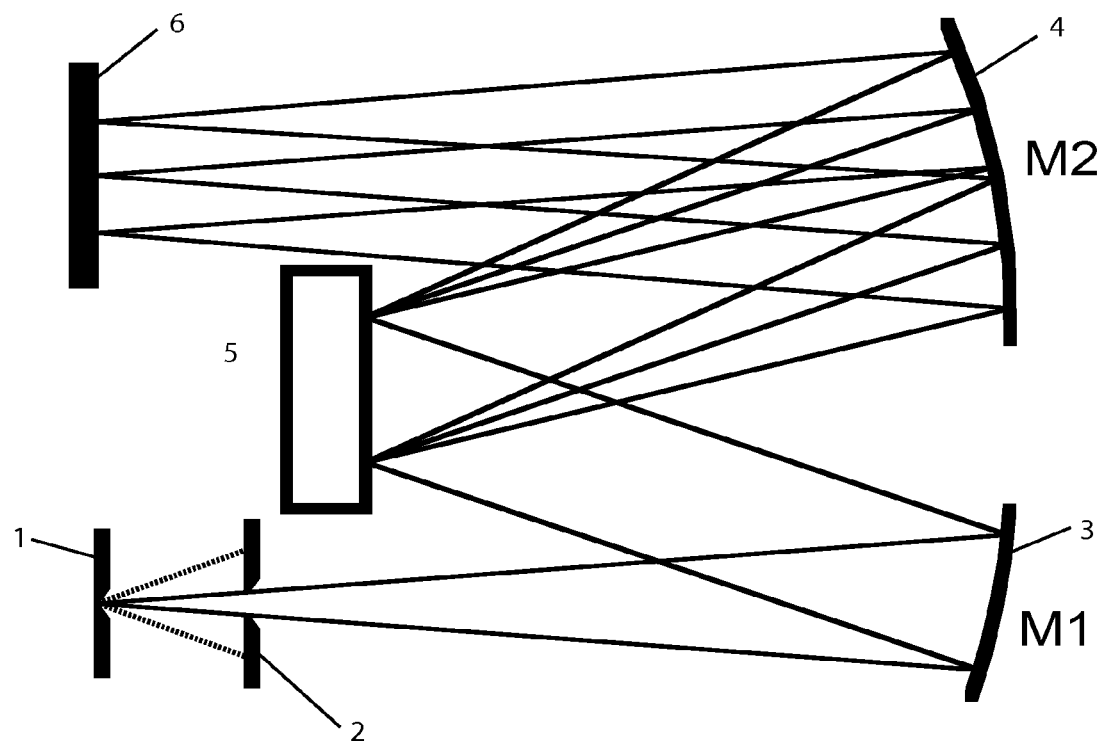
FIG. 1 shows a layout of a generalized prior art Czerny-Turner spectrometer.

Also, conventional spectrometers employ an entrance slit (1) and limiting aperture (2) as shown in FIG. 1. These are both precision components that require special attention to mount into place and align with each other. During manufacture their relative positions define the optical axis of the spectrometer, and the subsequent optics (M1 (3), grating (5), and M2 (4)) must be aligned to bring the slit (1) image onto the desired portion of the detector (6) plane.

In a spectrometer designed around the principles outlined above, the positions of the mirrors (3 & 4), grating (5), and detector (6) never vary. Only the angle of the grating (5) changes in order to bring the desired spectral range onto the detector (6). Therefore, the usual alignment process is reversed, and the position of the source, entrance slit (1), and aperture (2) must be brought to the location defined by the minors (3 & 4), grating (5), and detector (6). In order to achieve this it is necessary to simultaneously adjust the source, slit (1), and aperture (2).

This can be conveniently achieved by fabricating the slit (1) and aperture (2) from an optically opaque coating on opposite sides of a transparent substrate block (9) using photolithographic techniques. If the resulting silt (1)/aperture (2) block (9) is affixed to the input of the spectrometer, then the object of combining the source, slit (1), and aperture (2) into a single source assembly can be achieved.

In conventional spectrometer designs the mounting of the slit (1) and aperture (2) are both problematic, and mechanical adjustments are required for each of the optical components and the detector (6) in order to optimize performance during assembly.

If the mounting and fabrication tolerances of the mirrors (3 & 4), grating (5), and detector (6) are adequately controlled, only small motions of the slit (1)/aperture (2) block (9) are required to bring the overall system into compliance with the geometry specified in the previous section. Therefore, the entire spectrometer can be brought into optimum alignment without the need for adjustable mounts on any component other than the source assembly.

Finally, early spectrometers utilized either an exit slit and single element detector (monochromator) or a photographic plate at the image plane (spectrograph). In both cases, the orientation of the detection system is perpendicular to the dispersion plane of the optical system in order to capture the dispersed spectral components.

When the photographic plate is replaced with a linear array of detectors this orientation has been retained. However, unlike the case of a photographic plate, a semiconductor array requires a subsystem of electrical connections that must be maintained.

The optical train of a spectrometer must be rigorously light-tight to avoid background signal from undispersed light. In order to perform its function a detector array must be brought into this light-tight region. Maintaining its various electrical connections in this conventional orientation poses difficulties, particularly when the position of the array must be aligned to the output of the spectrometer.

When the spectrometer design takes advantage of the two inventions disclosed above, it is clear that the optimum position of the detector (6) is known prior to any system alignment, and that there is no requirement for its position to be adjusted to optimize performance. Since there is no need to accommodate any motion in the attachment of the detector (6) to the spectrometer, it is possible to achieve an additional simplification in the design of the spectrometer.

If the detector (6) is fabricated on an optically opaque substrate, it can be used to form a portion of the wall enclosing the light-tight region of the spectrometer. If the substrate takes the form of a printed circuit board (PCB) which supports the operation of the detector (6) by bringing the required electrical connections through to the opposite side of the PCB, then no electrical components need be placed in the light-tight region of the spectrometer. In this case, the supporting electronics are mounted on the outside walls of the spectrometer, increasing the overall footprint of the device.

However, if a planar mirror oriented at 45° is placed in the optical path immediately in front of the detector, the detector can be mounted as a portion of the bottom (or top) of the optical enclosure, allowing its associated electronics to lie entirely within the footprint of the optical components.

It should be clear that this 45° minor can preferably take the form of a right angle prism (7), which can employ either total internal reflection or a reflective coating on its hypotenuse to accomplish the desired reflection. One advantage of using a right angled prism (7) as the 45° minor is that the output facet of the prism (7) is parallel to and close to the sensor array (6) and therefore provides an extremely convenient surface for mounting an optical filter (8) for purposes of order-sorting (preventing, for example, second order diffraction light at 400 nm being detected as first order light at 800 nm, giving false spectra). Such a filter (8) could be mounted as a separate piece affixed to the prism (7) surface or deposited as a thin film layer or stack of layers directly on the surface of the prism (7) for maximal space saving.

Figure 4A:
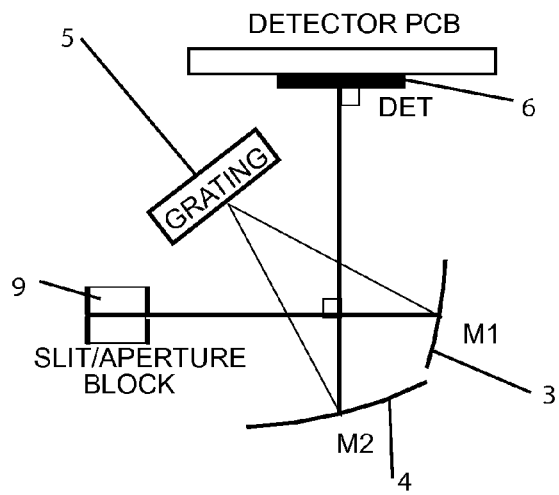
FIG. 4 shows a layout of a preferred embodiment of the invention.
Figure 4B:
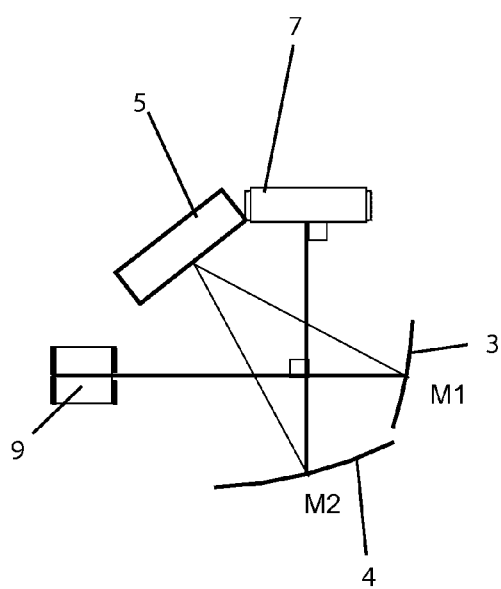
Figure 4C:
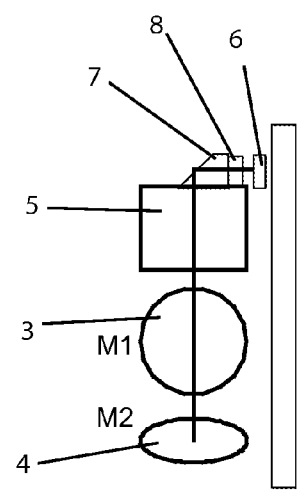

Referring now to FIG. 4, the layout shown in FIG. 4a is a top-down view of a spectrometer designed according to the previous two inventions, namely the combined slit/aperture block (9) and the aberration-compensated geometry. Note that the detector (6) array is required to be mounted on a supporting PCB that must lie outside the bounds of the optical train. In FIG. 4b, the optical path had been folded down into the plane of the drawing by the use of a 45 degree prism (7). FIG. 4c shows the same geometry from a side view. Note the convenient means of attaching an order sorting filter (8) (OSF).

To summarize the above, the 90° fold in the optical path to the detector (6) causes the plane of the main optical path and the electrical assembly to be parallel. Thus allowing a more compact spectrometer design by stacking the optical and electrical layers where there is a natural light-tight seal between the layers in the form of the detector (6) substrate (typically a PCB). A further advantage of this configuration is that with a minimal increase in packaging size and no change to the layout, a thermo-electric cooler (TEC) can be mounted directly under the sensor chip in order to reduce the operating temperature of the sensor array. Adding a TEC directly under the sensor chip instead of under a packaged sensor requires a much smaller TEC and therefore less package space and less power to operate. Therefore the benefits of cooling (lower dark current, improved signal-to-noise ratio) can be realized with minimal increase in space, power budget and cost.

Since certain changes may be made in the above described spectrometer design features without departing from the scope of the invention herein involved, it is intended that all matter contained in the description thereof or shown in the accompanying figures shall be interpreted as illustrative and not in a limiting sense.

What is claimed is:

1. A method of aligning a compact spectrometer device comprising a light entrance slit and an aperture placed on opposite sides of a transparent input block, a detector, a diffraction grating having a center wavelength, and a folded optical path formed using a first mirror creating a fold angle and a second minor creating a fold angle comprising:

first determining said center wavelength of said diffraction grating;

then aligning said first minor, said diffraction grating, and said second mirror such that said folded optical path is formed on one plane and said fold angle of said center wavelength of said folded optical path at said first mirror is equal to said fold angle of said center wavelength of said folded optical path at said second minor; and, then further aligning said first mirror, said diffraction grating, and said second minor such that a section of said folded optical path of said center wavelength between said aperture and said first minor crosses a section of said optical path of said center wavelength between said second mirror and said detector at a ninety degree angle.

2. A spectrometer device comprising a light entrance slit, an aperture, a detector, and a diffraction grating comprising said light entrance slit and said aperture placed on opposite sides of a transparent input block.

3. The method of claim 1 further comprising aligning a means for reflection at a 45 degree angle with respect to said folded optical path in front of said detector.

4. The method of claim 3 wherein said means for reflection is a right angled prism.

\* \* \* \* \*